Nov. 21, 1933.                P. B. RENFREW                1,935,667
                    MEANS FOR PREVENTING ERROR IN METERS
                           Filed July 17, 1931           2 Sheets-Sheet 2
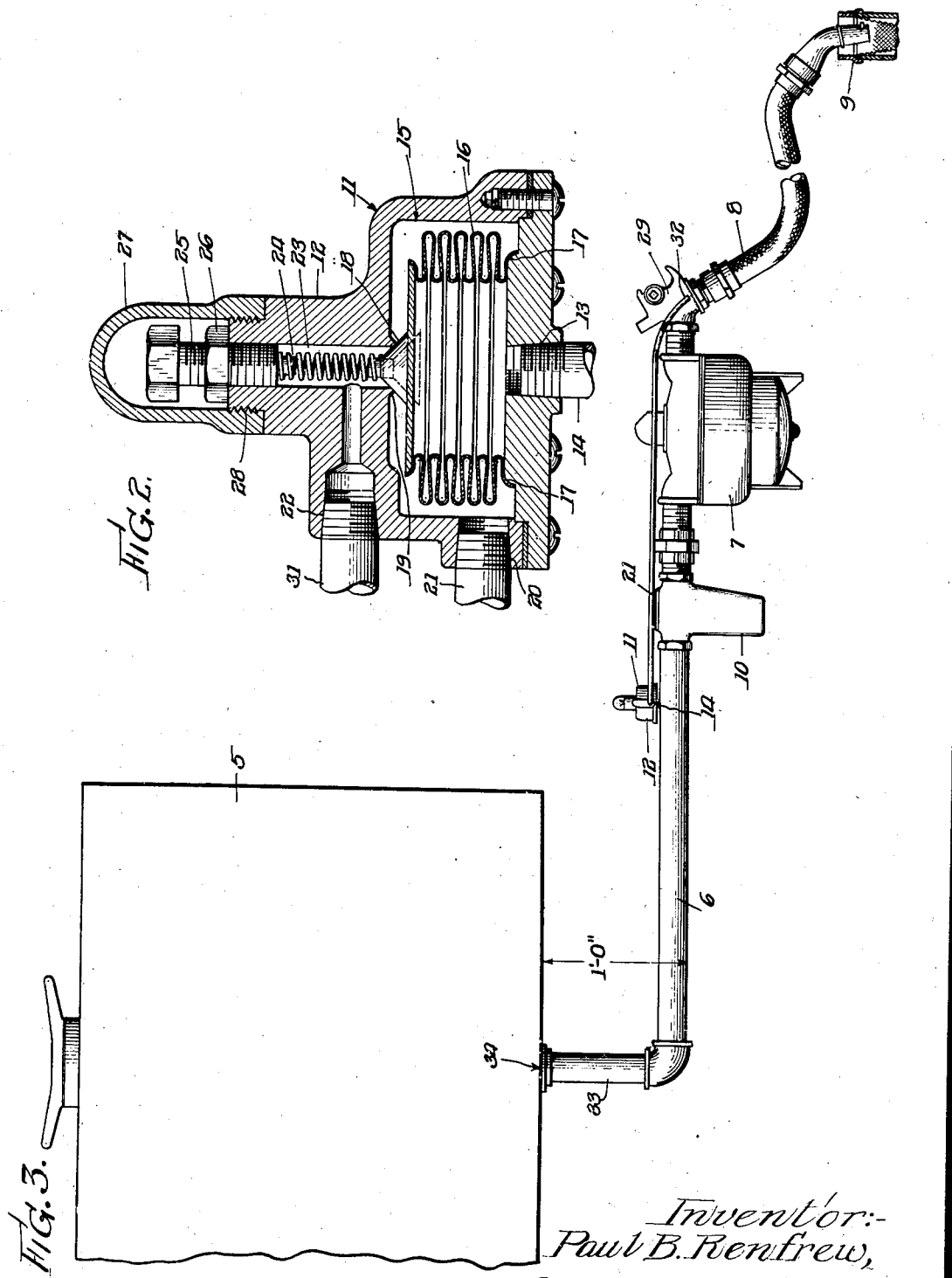
Inventor:-
Paul B. Renfrew,
By:- Cheever, Cox & Moore
                atty's Patented Nov. 21, 1933

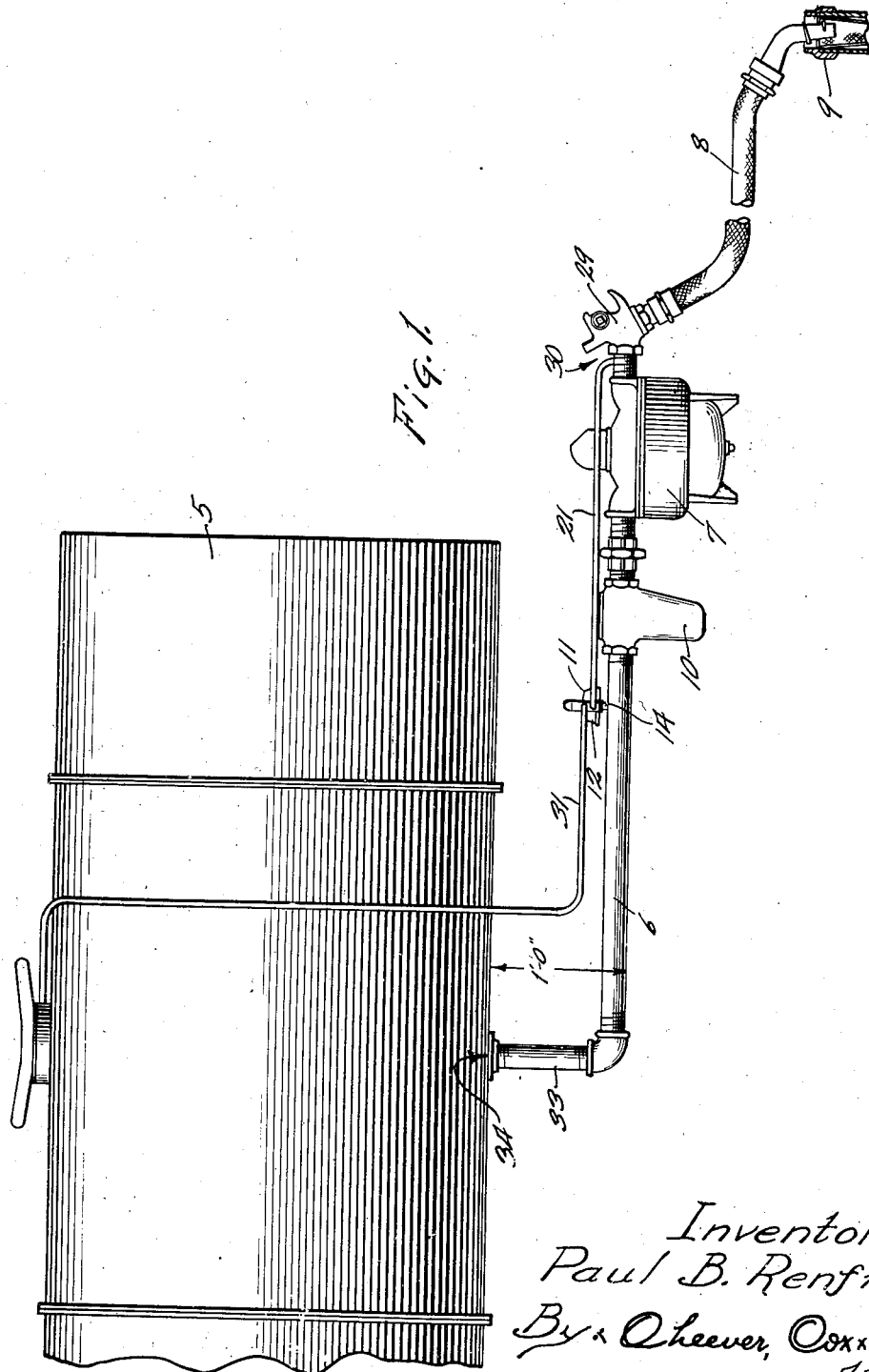

1,935,667

UNITED STATES PATENT OFFICE 1,935,667

MEANS FOR PREVENTING ERROR IN METERS

Paul B. Renfrew, Fort Wayne, Ind., assignor to S. F. Bowser & Company, Inc., Fort Wayne, Ind., a corporation of Indiana Application July 17, 1931. Serial No. 551,442

20 Claims. (Cl. 221—95)

This invention relates to valves in general and particularly to vent valves for liquid dispensing systems. The invention is illustrated in connection with a liquid dispensing system for emptying gasoline from a truck tank to a stationary tank disposed at a level below that of the truck tank.

The primary object of the invention is to provide a new and improved vent valve for venting a discharge line beyond the volume meter for the purpose of preventing operation of the meter after the liquid has ceased flowing.

Another object of the invention is to provide a new and improved vent valve to prevent over travel of the meter when the compartment carrying the liquid measured becomes empty.

A further object of the invention is to provide an improved vent valve on pipe lines carrying a meter for measuring the liquid being drained from a compartment which will prevent over travel of the meter when the compartment is empty, which will permit a siphonic process or siphon effect to assist in drawing the liquid from the compartment until the liquid in the compartment reaches a predetermined minimum level, and which will prevent the siphonic process or siphon effect from continuing after the liquid head reaches a predetermined minimum.

A still further object of the invention is to provide a vent valve for gasoline tanks and trucks, which valve is located forwardly of the measuring volume meter and which is vented to the pipe line beyond the meter and operable when the liquid head on the meter reaches a predetermined minimum for the purpose of preventing a siphon effect from occurring and causing over travel of the meter when the liquid head on the meter reaches a certain predetermined amount, but which permits the siphon effect to continue and assists in drawing the fluid from the tank until the liquid has reached a predetermined minimum, there being adjustable means provided to cause operation of the valve determinable upon the liquid head on the meter.

Numerous other objects and advantages will be apparent throughout the progress of the following specification.

The accompanying drawings illustrate a selected embodiment of the invention and the views therein are as follows:

Fig. 1 is a detail elevation showing the improved valve applied in position on the discharge line of a tank.

Fig. 2 is a detail sectional elevation of the improved valve.

Figure 3 is a detail elevation showing a modified arrangement of the valve in position on the discharge line.

Referring to the drawings, 5 designates a tank having a discharge line 6 to which a volume meter 7 is operatively connected. A hose 8 is operatively connected rearwardly of the meter and is adapted to extend into an inlet 9 of an underground storage tank (not shown). A strainer 10 may be interposed in the discharge line 6 forwardly of the meter 7 for the purpose of straining the liquid passing through the line 6. However, while the invention is explained in connection with an automobile truck tank, it is to be understood that it is adaptable for use to any tank located higher than the meter, where the operation of the meter is by gravity and where the tank is freely emptied.

In practice, it is usual, and particularly in filling stations, for the driver of the truck to open the valve and then leave the truck until the tank is about empty. In most cases the driver does not return until the tank is completely empty. Therefore, the volume meters which are adapted to measure air and gases as well as liquids, may continue to operate for a short while after the last of the liquid supply has passed the meter, due to the siphonic or air sucking effect produced through the meter by the passage of the last of the fluid through the relatively long discharge conduit and hose extension 8, whereby the meters will be caused to over travel and will register air as well as liquid.

It has been considerable of a problem to obtain accurate registration of the meter due to the over travel of the meter when the compartment becomes empty. The problem is considerably increased where the meters are of larger capacity and the discharge hose is long. Naturally, to save time it is desirable that the meter be operated as fast as possible so that the tank may be emptied quickly. The speed of operation of meters for this purpose is governed by the head on the inlet side of the meter together with the negative head on the outlet side of the meter. In practice, the meters usually have a hose discharge, there being a drop of from twenty-four inches to thirty-six inches from the storage tank to the truck tank discharge and inasmuch as it is desirable to drain the truck tank as quickly as possible, it is desired that the outlet end of the meter be not vented to slow up the discharge of the tank until the head on the inlet side of the meter diminishes to a predetermined minimum. In order to get the maximum speed of delivery out of the outlet side of the meter, the outlet side of the meter should not be vented until about the time the compartment is empty. If the outlet side is not vented when the compartment does become empty, the momentum of the liquid passing through the meter causes the meter to over travel and draw air into the meter instead of liquid, thereby resulting in misregistration at the time the tank is empty and subsequent misregistration when the meter is first started after the compartment has again been filled. This continues until all the fluid is drained from the hose 8. The purpose, therefore, of the present invention is to allow the meter to operate at full capacity, without venting the discharge side of the meter until the head on the inlet side has been reduced to approximately one foot. At this stage the valve will automatically vent the discharge side of the meter and prevent misregistration by allowing air to be drawn into the hose 8 through the vent instead of through the meter.

In automobile tanks there is a drop of approximately twenty-four inches to thirty-six inches from the tank bottom to the hose discharge, said latter discharge being usually about ground level. This drop materially aids in the speeding up of the meter.

The improved valve, which is designated generally by the numeral 11, is preferably located inwardly of the strainer 10. The valve comprises a casing 12 which has a port 13 provided in its bottom to receive a nipple 14 which nipple connects the valve to the discharge line 6. An interior chamber 15 is provided in the valve casing and has communication with the port 13. A flexible bellows 16 is arranged in the chamber 15 and is sealed to the bottom of the casing as indicated at 17. This bellows is adapted to expand when there is pressure in the discharge line 6 and when expanded moves the valve 18 against its seat 19.

A port 20 is provided through the side wall of the casing and has communication with the chamber 15. A vent line 21 has a screw connection with the port 20 and leads to a point rearwardly or beyond the meter 7. An air intake port 22 is provided in the side of the valve and has communication with a passage 23, the passage 23 being located beyond the valve 18 and having communication with the chamber 15. A spring 24 is arranged in the passage 23 and urges the valve 18 off its seat and toward the top of the bellows 16. A threaded member or adjusting screw 25 engages the spring 24 and its purpose is to increase or diminish the tension of the spring 24 against the valve 18. This screw member acting against the spring 24 makes it possible for adjustment so that the valve will open at any predetermined static head. A lock nut 26 also engages the stem of the set screw 25 for holding the screw in its adjusted position. A top cap 27 may be provided for housing the adjustment screw 25 and the lock nut 26 and this cap may threadedly engage an upstanding stem on the casing as indicated at 28.

A shut-off valve 29 is preferably arranged in the hose 8 and it is preferably arranged between the upper end of the hose 8 and the outlet side of the meter 7.

The vent line 21, as shown in Fig. 1, enters the discharge line on the inlet side of the shut-off valve 29 as indicated at 30. When the truck tank is full of liquid and is traveling on the road from the bulk plant to the filling station, the vent line 21 will be full of fluid under pressure. Therefore, in order to have positive assurance that there will be no leakage through the valve 18 and out of the port 22, it is necessary that a vent line 31, connect the port 22 to the top of the compartment or tank 5. However, if the vent line 21 is connected into the discharge from the meter at a point beyond the shut-off valve 29, as shown in Figure 3 of the drawings, at 32, the vent pipe is not subject to any liquid pressure at any time and, therefore, it is not necessary to run the return pipe 31 from the port 22 to the top of the tank.

By referring to Figure 3, it will be seen that by placing the discharge end of the discharge vent 21 at 32 beyond the shut off valve 29, I can eliminate the necessity of using a return line such as the pipe 31 shown in Figure 1. The simplified construction shown in Figure 3 is an advantage over the alternative structure shown in Figure 1 inasmuch as it eliminates the extra pipe 31, which is objectionable especially when two or more meters are mounted on the same truck thus requiring an extra pipe 31 for each meter if the arrangement shown in Figure 1 is In operation the minimum liquid head level on the meter 7 is approximately one foot. This measurement is taken from the bottom of the tank to the discharge line 6. As previously mentioned, it is preferable that the tank 5 be emptied as soon as possible, permitting the siphon process or effect to continue until all the liquid is drained out of the tank. It is also preferable that the one foot head on the meter be maintained at all times to prevent the meter from over traveling due to the withdrawing of the liquid from the riser 33 and also to prevent misregistration when the meter is first started after the compartment 5 has been again filled. Therefore, the adjusting screw 25 is set to relieve the pressure on the bellows 16 when the liquid line reaches the point indicated at 34 which is substantially the bottom of the tank. When the pressure is reduced against the bellows 16, the spring 24 will push the valve 18 downwardly, permitting air to enter the port 22, pass into the chamber 15 and then out of the port 20 to vent the meter beyond its discharge. When this happens, the siphonic process or siphon effect is relieved or released, thereby preventing the meter from over traveling and measuring air as well as the already measured liquid.

If the normal head on the meter is more or less than one foot, as herein indicated, the adjustment screw 25 is operated to take care of the different liquid heads.

The invention comprises a vent valve which permits a tank to be quickly emptied by the siphonic process or siphon effect but prevents over travel and misregistration of the meter, when the liquid in the tank has reached a predetermined low level or a predetermined head on the inlet side of the meter. The present valve herein shown is positive and efficient in operation, is rugged and substantial in construction, and may be readily and economically installed and manufactured.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a liquid dispensing system, the combination of a discharge line, a meter operatively connected to said discharge line for measuring the fluid passing through the line, said meter having an inlet and an outlet and means for admitting air to the outlet side of said meter when the fluid pressure at the inlet reaches a predetermined minimum, said means comprising means forming a casing having a chamber, a valve in said chamber, a seat for said valve, a bellows in said chamber and closing the valve when pressure is applied to the bellows, said valve being normally urged toward open position, and a pair of ports communicating with the chamber, means to connect the bellows to the meter inlet and means to connect at least one of the ports to the meter outlet.

2. In a liquid dispensing system, the combination of a discharge line, a meter operatively connected to said discharge line for measuring the fluid passing through the line, said meter having an inlet and an outlet and means for admitting air to the outlet side of said meter when the fluid pressure at the inlet reaches a predetermined minimum, said means comprising means forming a casing having a chamber, a valve in said chamber, a seat for said valve, a bellows in said chamber and closing the valve when pressure is applied to the bellows, said valve being normally urged toward open position, a pair of ports communicating with the chamber, said last two ports adapted to let air pass therethrough only when the valve is moved off its seat, means to connect the bellows to the meter inlet and means to connect at least one of the ports to the meter outlet.

3. In a liquid dispensing system, the combination of a discharge line, a meter operatively connected to said discharge line for measuring the fluid passing through the line, said meter having an inlet and an outlet and means for admitting air to the outlet side of said meter when the fluid pressure at the inlet reaches a predetermined minimum, said means comprising means forming a casing having a chamber, a valve in said chamber, a seat for said valve, a bellows in said chamber and closing the valve when pressure is applied to the bellows, said valve being normally urged toward open position, adjustable means for varying the spring pressure against said valve, a pair of ports communicating with said chamber, means to connect the bellows to the meter inlet and means to connect at least one of the ports to the meter outlet.

4. In a liquid dispensing system, the combination of a discharge line, a meter operatively connected to said discharge line for measuring the fluid passing through the line, said meter having an inlet and an outlet and means for admitting air to the outlet side of said meter when the fluid pressure at the inlet reaches a predetermined minimum, said means comprising means forming a casing having a chamber, a valve in said chamber, a seat for said valve, a bellows in said chamber and closing the valve when pressure is applied to the bellows, said valve being normally urged toward open position, adjustable means for varying the spring pressure against said valve, a pair of ports communicating with said chamber, and a vent pipe connecting at least one of said last named ports to the meter discharge and means to connect the bellows to the meter inlet.

5. In combination, a liquid reservoir, a discharge line leading from said reservoir, a meter operatively connected to said discharge line for measuring the liquid passing through the discharge line, said meter having an inlet side and an outlet side, a vent valve connected to the discharge line at the intake side of the meter and operable to open position when the pressure on the valve reaches a predetermined minimum, and a pipe line connecting the valve to the discharge line at the discharge side of the meter to vent the line at that point to prevent misregistration of the meter due to over travel.

6. The combination of a liquid reservoir, a discharge line leading from said reservoir, a meter interposed in said discharge line and having an inlet side and an outlet side, a hose connected to the outlet side of the meter, a shut-off valve for said hose, a vent valve operatively connected to said discharge line and being provided with means for venting the meter at its outlet side when the liquid pressure in the discharge line reaches a predetermined minimum.

7. The combination of a liquid reservoir, a discharge line leading from said reservoir, a meter interposed in said discharge line and having an inlet side and an outlet side, a hose connected to the outlet side of the meter, a shut-off valve for said hose, a vent valve operatively connected to said discharge line, a vent line connecting the valve to a point beyond the outlet side of the meter, said vent valve being constructed and arranged to be normally closed when pressure is in the discharge line but open to permit air to pass therethrough and vent the discharge line at the outlet side of the meter to prevent over travel of the meter caused by the siphon effect of the liquid passing through the discharge line and hose.

8. The combination of a liquid reservoir, a discharge line leading from said reservoir, a meter interposed in said discharge line and having an inlet side and an outlet side, a hose connected to the outlet side of the meter, a shut-off valve for said hose, a vent valve operatively connected to said discharge line, a vent line connecting the valve to a point beyond the shut-off valve, said vent valve being provided with a plurality of ports, means for closing one of said ports when the pressure in the discharge line is at a predetermined maximum to prevent the discharge line from being vented when there is a predetermined pressure in the discharge line, said means operating to permit air to pass through another of said ports and into said vent line to vent the discharge line when the pressure in the discharge line reaches a predetermined minimum.

9. The combination of a liquid reservoir, a discharge line leading from said reservoir, a meter interposed in said discharge line and having an inlet side and an outlet side, a hose connected to the outlet side of the meter, a shut-off valve for said hose, a vent valve operatively connected to said discharge line, a vent line connecting the valve to a point beyond the shut-off valve, said vent valve being provided with a plurality of ports, means for closing one of said ports when the pressure in the discharge line is at a predetermined maximum to prevent the discharge line from being vented when there is a predetermined pressure in the discharge line, said means operating to permit air to pass through another of said ports and into said vent line to vent the discharge line when the pressure in the discharge line reaches a predetermined minimum, and an inlet line connected to said second named port and leading to the interior of said reservoir.

10. In combination, a liquid reservoir, a discharge line leading from said reservoir, a meter operatively connected to said discharge line for measuring the liquid passing through the discharge line, said meter having an inlet side and an outlet side, a vent valve connecting with the discharge line at the intake side of the meter and operable to open position when the pressure on the valve reaches a predetermined minimum, a pipe line connecting the valve to the discharge line at the discharge side of the meter to vent the line at that point to prevent misregistration of the meter due to over travel, and a second pipe line leading from said valve to the reservoir to prevent any liquid in the line from spilling out of the valve.

11. The combination of a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a vent valve operatively connected to a discharge line, said valve having an outlet port and an inlet port, a port communicating with the discharge line, a vent line connecting the outlet port to the discharge line at the discharge side of the meter, and an expansible and contractible seal member arranged inside of the vent valve, said seal member adapted to expand when a certain predetermined pressure exists in said discharge line and shutting off communication with the inlet port.

12. The combination of a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a vent valve operatively connected to a discharge line, said valve having an outlet port and an inlet port, a port communicating with the discharge line, a vent line connecting the outlet port to the discharge line at the discharge side of the meter, an expansible and contractible seal member arranged inside of the vent valve, said seal member adapted to expand when a certain predetermined pressure exists in said discharge line and shutting off communication with the inlet port, and resilient means opposing the normal expansion of the seal member for contracting the seal member when the pressure in the discharge line reaches a predetermined minimum.

13. The combination of a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a vent valve operatively connected to a discharge line, said valve having an outlet port and an inlet port, a port communicating with the discharge line, a vent line connecting the outlet port to the discharge line at the discharge side of the meter, an expansible and contractible seal member arranged inside of the vent valve, said seal member adapted to expand when a certain predetermined pressure exists in said discharge line and shutting off communication with the inlet port, resilient means opposing the normal expansion of the seal member for contracting the seal member when the pressure in the discharge line reaches a predetermined minimum, and means for adjusting said resilient member to vary the pressure against said seal member.

14. The combination of a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a vent valve operatively connected to a discharge line, said valve having an outlet port and an inlet port, a port communicating with the discharge line, a vent line connecting the outlet port to the discharge line at the discharge side of the meter, an expansible and contractible seal member arranged inside of the vent valve, said seal member adapted to expand when a certain predetermined pressure exists in said discharge line and shutting off communication with the inlet port, resilient means opposing the normal expansion of the seal member for contracting the seal member when the pressure in the discharge line reaches a predetermined minimum, means for adjusting said resilient member to vary the pressure against said seal member, and a pipe line connected to said inlet port and leading to the interior of said tank.

15. The combination with a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a valve casing operatively connected to said discharge line, said casing having a chamber therein, a port leading from said chamber and communicating with the discharge line, a discharge port communicating with said chamber, a vent line leading from said discharge port and communicating with the discharge line at a point beyond the outlet side of the meter, a passage in said casing and communicating with said chamber, a valve seat about said passage, a valve for closing said passage, a metal bellows arranged in said chamber and sealed about the first named port, said bellows normally engaging said valve and adapted to hold the valve in closed position against its seat when a certain predetermined pressure exists in said discharge line, spring means for urging the valve toward the bellows and tending to move the valve to open position, said casing having an inlet port communicating with said passage, said bellows being contractible when the pressure in the discharge line reaches a predetermined minimum, said spring urging the valve to open position when the pressure reaches a predetermined minimum and permitting air to enter the inlet port, pass through the chamber and out of the outlet port and into the vent valve and venting the discharge line.

16. The combination with a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a valve casing operatively connected to said discharge line, said casing having a chamber therein, a port leading from said chamber and communicating with the discharge line, a discharge port communicating with said chamber, a vent line leading from said discharge port and communicating with the discharge line at a point beyond the outlet side of the meter, a passage in said casing and communicating with said chamber, a valve seat about said passage, a valve for closing said passage, a metal bellows arranged in said chamber and sealed about the first named port, said bellows normally engaging said valve and adapted to hold the valve in closed position against its seat when a certain predetermined pressure exists in said discharge line, spring means for urging the valve toward the bellows and tending to move the valve to open position, said casing having an inlet port communicating with said passage, said bellows being contractible when the pressure in the discharge line reaches a predetermined minimum, said spring urging the valve to open position when the pressure reaches a predetermined minimum and permitting air to enter the inlet port, pass through the chamber and out of the outlet port and into the bent valve and venting the discharge line, and adjusting means for regulating the pressure on the valve.

17. The combination with a truck tank having a reservoir, a discharge line leading from said reservoir and adapted to discharge into a second reservoir at a point lower than the first reservoir, a meter interposed in said discharge line and having an inlet side and an outlet side, said discharge line including a flexible pipe line, a shut-off valve interposed in the discharge line beyond the outlet side of said meter, of a valve casing operatively connected to said discharge line, said casing having a chamber therein, a port leading from said chamber and communicating with the discharge line, a discharge port communicating with said chamber, a vent line leading from said discharge port and communicating with the discharge line at a point beyond the outlet side of the meter, a passage in said casing and communicating with said chamber, a valve seat about said passage, a valve for closing said passage, a metal bellows arranged in said chamber and sealed about the first named port, said bellows normally engaging said valve and adapted to hold the valve in closed position against its seat when a certain predetermined pressure exists in said discharge line, spring means for urging the valve toward the bellows and tending to move the valve to open position, said casing having an inlet port communicating with said passage, said bellows being contractible when the pressure in the discharge line reaches a predetermined minimum, said spring urging the valve to open position when the pressure reaches a predetermined minimum and permitting air to enter the inlet port, pass through the chamber and out of the outlet port and into the vent valve and venting the discharge line, adjusting means for regulating the pressure in the valve, and a pipe line leading from said inlet port and communicating with the interior of the reservoir.

18. In a liquid dispensing system, the combination of a discharge line, a meter operatively connected to said discharge line for measuring the fluid passing through the line, said meter having an inlet and an outlet and means for admitting air to the outlet side of said meter when the fluid pressure at the inlet reaches a predetermined minimum, said means comprising a casing forming an internal chamber and providing a valve seat leading to said chamber, a valve adapted to close said seat, pressure operated means in said chamber for closing said valve, a pressure connection to said chamber to operate said pressure means, an air inlet for said chamber, said air inlet being controlled by the closing of said valve on its seat, and an air exhaust from said chamber, said pressure connection extending to and communicating with the meter inlet and the air exhaust from said chamber communicating with the meter outlet.

19. The combination with a fluid discharge line, of a meter interposed in said line and having an inlet side and an outlet side and means to vent the outlet side of the meter when the liquid pressure at the inlet side thereof reaches a predetermined minimum.

20. The combination with a fluid discharge line, of a meter interposed in said line and having an inlet side and an outlet side and means to vent the outlet side of the meter when the liquid pressure at the inlet side thereof reaches a predetermined minimum, said means comprising a valve having an operating connection with the inlet side of the meter and a venting connection with the outlet side of the meter.

PAUL B. RENFREW.